United States Patent Office 3,733,312
Patented May 15, 1973

3,733,312
POLYMER COMPOSITIONS
Gerbrand Deetman, St. Louis, Mo., assignor to
Monsanto Company, St. Louis, Mo.
No Drawing. Filed Aug. 12, 1971, Ser. No. 171,322
Int. Cl. C08f 27/08
U.S. Cl. 260—78.5 T                      10 Claims

ABSTRACT OF THE DISCLOSURE

Novel quaternary salt modified esters of maleic anhydride copolymers are film forming resins useful, for example, as holding agents in hair sprays.

BACKGROUND OF THE INVENTION

This invention relates to novel polymer compositions composed of quaternary salt modified esters of linear maleic anhydride copolymers.

A number of derivatives of maleic anhydride copolymers useful as film forming or coating resins are well known to the chemical art. Such derivatives are employed, for example, as holding agents in hair spray formulations to form a coating for retention of various hair styles. However, many of the presently known resins suffer from certain disadvantages. For example, the solubility in water of some is so low as to preclude application to wet hair. Others exhibit undesirably high levels of tackiness or tend to crack and flake from hair after application thereto.

SUMMARY OF THE INVENTION

It is an object of this invention to provide novel film forming resins having desirable properties with respect to solubility in water, freedom from tackiness, and the like.

These resins are quaternary salt modified esters of linear maleic anhydride copolymers. The novel polymer compositions of this invention, their preparation and properties will be understood from the following description of the preferred embodiments.

DESCRIPTION OF THE PREFERRED EMBODIMENTS

The novel polymer compositions of this invention consist of linear polymer chains composed of repeating units represented by the formula $$-R_1-CH-CH-$$
$$\quad\quad\quad | \quad\quad |$$
$$\quad\quad COOR_2 \ COOM$$

In the above formula $R_1$ is

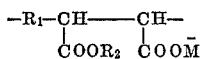

or

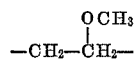

$R_1$ need not be the same in each repeating unit or in each polymer chain. It is preferred that $R_1$ be —$CH_2CH_2$— in which case the "backbone" of the polymer chain will be recognized as derived from the well known ethylene/maleic anhydride copolymer.

In some of the repeating units, $R_2$ will be an alkyl group having from 1 to 18 carbon atoms and attached via a primary carbon atom and in other repeating units $R_2$ will be a quaternary salt group represented by the formula

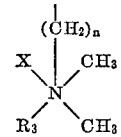

wherein $n$ is an integer from 2 to 3, X is chlorine or bromine and $R_3$ is —$(CH_2)_m$—$CH_3$, $m$ being an integer from 0 to 3, or

$a$ being an integer from 0 to 20.

The average numerical ratio of repeating units to quaternary salt groups will be from 10:1 to 200:1, preferably from 100:3 to 50:1. This is required to provide desired product properties and solubility.

The ratio is designated "average" in view of the fact that individual polymer chains in the composition may contain higher or lower ratios of quaternary salt groups.

The $R_2$ alkyl groups can be linear or branched.

It is preferred that $R_2$ alkyl groups be ethyl or normal butyl.

In the formula of the repeating unit, M represents hydrogen, an alkali metal, ammonium, or

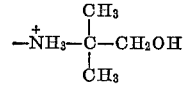

group, the latter being preferred in view of superior solubility in aerosol type solutions.

Thus, the polymers can be entirely of the acid form (all M is hydrogen) or totally or partially neutralized.

In a preferred embodiment of this invention, M is hydrogen in 70% to 90% of the repeating units and an alkali metal, ammonium, or preferably,

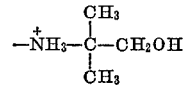

in from 10% to 30% of the repeating units.

The polymer chains constituting the compositions of this invention will have an average of from 40 to 1000 repeating units.

The polymer compositions of this invention can be prepared by reacting well known, substantially equimolar copolymers of maleic anhydride having an average of from 40 to 1000 repeating units represented by the formula

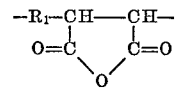

wherein $R_1$ is as previously defined, with the appropriate 1 to 18 carbon monohydroxy alcohol and β-hydroxy quaternary amine salt. For convenience, the average number of repeating units in the maleic anhydride polymer chain is generally correlated with specific viscosity. For example, ethylene/maleic anhydride copolymers having an average of from 40 to 1000 repeating units exhibit a specific viscosity of from .08 to 1.3 as measured by conventional Ostwald viscometer technique in a 1% by weight solution in n-n-dimethylformamide.

The reaction is conveniently conducted in isopropanol solvent under pressures of from 1 to 30 p.s.i.g. at temperatures between 115° C. to 120° C.

The reaction provides the acid form of the polymer which is neutralized by conventional technique.

The β-hydroxy quaternary amine salts used in the reaction can be prepared by reacting β-hydroxy n,n-dimethyl ethanol or propanol amine with methyl chloride or

a being an integer from 0 to 20. The reaction is conveniently conducted in isopropanol.

The invention is further illustrated by the following examples wherein all parts and percentages are by weight unless otherwise indicated.

EXAMPLE I

Seven parts of HO—CH$_2$—CH$_2$—N(CH$_3$)$_3$·Cl, 441 parts ethyl alcohol and 252 parts 1:1 copolymer of ethylene/maleic anhydride copolymer having a specific viscosity of .5 to .7 are refluxed under 5 p.s.i.g. nitrogen until a clear viscous material is obtained.

This product is neutralized with 0.2% by weight 2-methyl-2 amino propanol.

EXAMPLE II

Five hundred four parts of ethylene/maleic anhydride copolymer as described in Example I is reacted with 289 parts 1-butanol and 14 parts of HO—CH$_2$—CH$_2$—N(CH$_3$)$_3$·Cl dissolved in 180 parts isopropanol as in Example I. (The isopropanol is substantially non-reactive due to stearic hindrance.)

The product is neutralized with 0.2% by weight 2 methyl-2 amino propanol. The neutralized material is both ethanol and water soluble.

EXAMPLE III

Two percent of the partially neutralized resins of Examples I and II are each dissolved in conventional aerosol propellant solvents consisting of 40% methylene chloride and 60% difluoromonochloromethane. The system is placed in a conventional aerosol valved container. When sprayed on hair, the system exhibits excellent holding power, imparts sheen, and is free from tackiness. Water solubility of the resin at pH of 4 or greater permits coating of wet hair or wet resetting.

What is claimed is:

1. A linear polymer composition consisting of repeating units represented by the formula

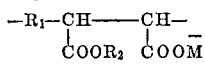

wherein R$_1$ is selected from the group consisting of

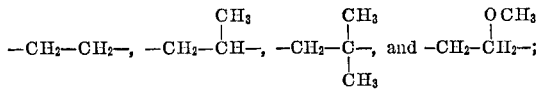

R$_2$ is selected from the group consisting of alkyl groups having from 1 to 18 carbon atoms and attached via a primary carbon atom and quaternary salt groups represented by the formula

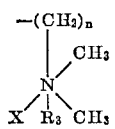

wherein $n$ is an integer from 2 to 3, X is selected from the group consisting of chlorine and bromine, and R$_3$ is selected from the group consisting of —(CH$_2$)$_m$—CH$_3$ wherein $m$ is an integer from 0 to 3 and

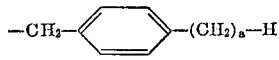

wherein $a$ is an integer from 0 to 20; M is selected from the group consisting of hydrogen, alkali metal, ammonium and

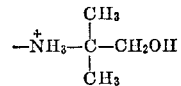

said polymer composition always containing at least one quaternary salt group and said composition having a numerical ratio of repeating units to quaternary salt groups of from 10:1 to 200:1 and the polymers in said composition having an average of from 40 to 1000 repeating units.

2. The polymer composition of claim 1 wherein M is hydrogen in from 70% to 90% of the repeating units and

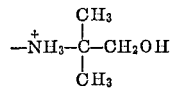

in from 10% to 30% of the repeating units.

3. The polymer composition of claim 1 wherein R$_1$ is —CH$_2$—CH$_2$—.

4. The polymer composition of claim 1 wherein the alkyl group of R$_2$ is ethyl.

5. The polymer composition of claim 1 wherein the alkyl group of R$_2$ is n-butyl and $n$ is 2.

6. The composition of claim 5 wherein the ratio of repeating units to quaternary salt groups is from 100:3 to 50:1.

7. The composition of claim 6 wherein R$_1$ is

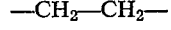

8. The composition of claim 7 wherein M is hydrogen in from 70% to 90% of the repeating units and

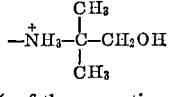

in from 10% to 30% of the repeating units.

9. The composition of claim 8 wherein R$_3$ is CH$_3$.

10. The composition of claim 8 wherein R$_3$ is

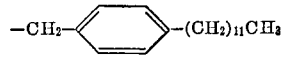

References Cited

UNITED STATES PATENTS

| | | | |
|---|---|---|---|
| 3,322,713 | 5/1967 | Williams | 260—29.6 |
| 2,984,639 | 5/1961 | Stamberger et al. | 260—32.4 |
| 2,087,506 | 7/1937 | De Groote | 260—99.12 |
| 2,723,195 | 11/1955 | Blake | 92—3 |
| 3,428,588 | 2/1969 | Skoultchi et al. | 260—23 |
| 3,488,329 | 1/1970 | Johnson | 260—78.5 |
| 2,646,416 | 7/1953 | Parker | 260—45.5 |

JOSEPH L. SCHOFER, Primary Examiner

J. KIGHT III, Assistant Examiner

U.S. Cl. X.R.

424—47, Dig. 2